(12) United States Patent
Lei

(10) Patent No.: US 11,546,092 B2
(45) Date of Patent: Jan. 3, 2023

(54) METHOD AND APPARATUS FOR HARQ-ACK FEEDBACK FOR CARRIER AGGREGATION

(71) Applicant: LENOVO (BEIJING) LIMITED, Beijing (CN)

(72) Inventor: Haipeng Lei, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 75 days.

(21) Appl. No.: 17/053,625

(22) PCT Filed: May 11, 2018

(86) PCT No.: PCT/CN2018/086586
§ 371 (c)(1),
(2) Date: Nov. 6, 2020

(87) PCT Pub. No.: WO2019/213957
PCT Pub. Date: Nov. 14, 2019

(65) Prior Publication Data
US 2021/0250130 A1    Aug. 12, 2021

(51) Int. Cl.
*H04B 7/0456* (2017.01)
*H04L 1/18* (2006.01)
*H04W 72/04* (2009.01)

(52) U.S. Cl.
CPC .......... *H04L 1/1816* (2013.01); *H04L 1/1864* (2013.01); *H04L 1/1896* (2013.01); *H04W 72/042* (2013.01); *H04W 72/0453* (2013.01)

(58) Field of Classification Search
None
See application file for complete search history.

(56) References Cited

U.S. PATENT DOCUMENTS 10,484,149 B2 * 11/2019 Guan ................ H04W 72/0413
10,750,488 B2 *  8/2020 He ........................ H04L 1/1896
(Continued)

FOREIGN PATENT DOCUMENTS

| WO | 2017024539 A1 | 2/2017 |
| WO | 2017028001 A1 | 2/2017 |

OTHER PUBLICATIONS

Fujitsu, "Clarification on Type-2 HARQ-ACK codebook determination", R1-1800128, TS 38.213, 3GPP TSG RAN WG1 Meeting AH 1801, Jan. 22-26, 2018, pp. 1-10.
(Continued)

*Primary Examiner* — Sithu Ko
(74) *Attorney, Agent, or Firm* — Kunzler Bean & Adamson

(57) ABSTRACT

Embodiments of the present application relate to a method and apparatus for hybrid automatic repeat request-acknowledge (HARQ-ACK) feedback for carrier aggregation (CA). A method according an embodiment of the present application may include receiving at least one downlink transmission; generating a first HARQ-ACK sub-codebook for the at least one downlink transmission; determining whether to generate a second HARQ-ACK sub-codebook; and transmitting a HARQ-ACK codebook. The HARQ-ACK codebook includes the first HARQ-ACK sub-codebook in response to the second HARQ-ACK sub-codebook determined not to be generated, or includes the first HARQ-ACK sub-codebook and the second HARQ-ACK sub-codebook in response to the second HARQ-ACK sub-codebook determined to be generated. The present application avoids misunderstanding between a base unit and a remote unit when generating the HARQ-ACK feedback for CA.

16 Claims, 4 Drawing Sheets

(56) References Cited

U.S. PATENT DOCUMENTS

| | | | |
|---|---|---|---|
| 10,790,942 B2* | 9/2020 | Wang | H04W 72/0453 |
| 2013/0148610 A1 | 6/2013 | Berggren et al. | |
| 2018/0241510 A1* | 8/2018 | Shen | H04L 1/1812 |
| 2019/0074952 A1* | 3/2019 | Bhattad | H04L 1/1861 |
| 2019/0297605 A1* | 9/2019 | Kim | H04L 5/0044 |
| 2019/0306841 A1* | 10/2019 | Huang | H04L 5/0055 |
| 2020/0059327 A1* | 2/2020 | Kini | H04L 1/1861 |
| 2020/0213044 A1* | 7/2020 | Peng | H04L 1/1819 |
| 2020/0374045 A1* | 11/2020 | Yin | H04W 72/042 |

OTHER PUBLICATIONS

PCT/CN2018/086586, "International Search Report and the Written Opinion of the International Search Authority" ISA/CN, State Intellectual Property Office of the P.R. China, dated Jan. 4, 2019, pp. 1-7.

* cited by examiner

METHOD AND APPARATUS FOR HARQ-ACK FEEDBACK FOR CARRIER AGGREGATION

TECHNICAL FIELD

Embodiments of the present application generally relate to hybrid automatic repeat request-acknowledge (HARQ-ACK) feedback, and more specifically to dynamic HARQ-ACK feedback for carrier aggregation (CA).

BACKGROUND OF THE INVENTION

In wireless communication technology, HARQ-ACK feedback technology is commonly used during data transmission, to provide feedback on whether data was correctly received in the downlink (DL) or uplink (UL) transmission. HARQ-ACK represents collectively the Positive Acknowledgement (ACK) and the Negative Acknowledgement (NACK). ACK means data was correctly received while NACK means data was erroneously received or missing. For HARQ-ACK feedback information (which may be called a HARQ-ACK codebook, for example), the HARQ-ACK codebook size is usually preconfigured and/or determined during transmission.

In addition, a solution of CA is introduced into 3rd Generation Partnership Project (3GPP) Long Term Evolution (LTE) Release 10, which enables two or more component carriers to be used together to provide high data transmission rates required for LTE Advanced.

However, in the case that a HARQ-ACK codebook consists of HARQ-ACK bits for multiple carriers in carrier domain and/or time domain for CA, issues on the HARQ-ACK codebook determination, especially the size of the HARQ-ACK codebook need to be solved, to avoid any misunderstanding between a base unit and a remote unit during data transmission.

Thus, improved HARQ-ACK feedback for multiple carriers in carrier domain and/or time domain for CA is desirable.

BRIEF SUMMARY OF EMBODIMENTS OF THE INVENTION

One objective of the embodiments of the present application is to provide a manner of HARQ-ACK feedback for CA.

An embodiment of the present application provides a method including: receiving at least one downlink transmission; generating a first HARQ-ACK sub-codebook for the at least one downlink transmission; determining whether to generate a second HARQ-ACK sub-codebook; and transmitting a HARQ-ACK codebook. The HARQ-ACK codebook includes the first HARQ-ACK sub-codebook in response to the second HARQ-ACK sub-codebook determined not to be generated, or includes the first HARQ-ACK sub-codebook and the second HARQ-ACK sub-codebook in response to the second HARQ-ACK sub-codebook determined to be generated.

According to an embodiment of the present application, each bit in the first HARQ-ACK sub-codebook corresponds to one transport block of the at least one downlink transmission, and each bit in the second HARQ-ACK sub-codebook corresponds to one code block group (CBG) of one transport block of the at least one downlink transmission. While, according to another embodiment of the present application, each bit in the first HARQ-ACK sub-codebook corresponds to one code block group of one transport block of the at least one downlink transmission, and each bit in the second HARQ-ACK sub-codebook corresponds to one transport block of the at least one downlink transmission.

In an embodiment of the present application, in response to the second HARQ-ACK sub-codebook determined to be generated, at least one bit is generated for the second HARQ-ACK sub-codebook.

According to an embodiment of the present application, in response to the second HARQ-ACK sub-codebook determined to be generated and each bit in the second HARQ-ACK sub-codebook corresponding to one transport block, one bit is generated for the second HARQ-ACK sub-codebook. According to another embodiment of the present application, in response to the second HARQ-ACK sub-codebook determined to be generated and each bit in the second HARQ-ACK sub-codebook corresponding to one code block group, M bits are generated for the second HARQ-ACK sub-codebook, wherein M is the configured maximum number of code block groups per transport block across all the carriers configured with CBG-based retransmission.

In an embodiment of the present application, generating a second HARQ-ACK sub-codebook is determined based on whether the at least one downlink transmission is only mapped to the first HARQ-ACK sub-codebook.

According to an embodiment of the present application, the method may include receiving an indicator and generating the second HARQ-ACK sub-codebook based on the received indicator. The received indicator may be included in downlink control information (DCI), and indicate a number of HARQ-ACK sub-codebooks or whether the second HARQ-ACK sub-codebook exists.

Another embodiment of the present application provides a method including: transmitting at least one downlink transmission; determining whether a HARQ-ACK codebook for the at least one downlink transmission includes only a first HARQ-ACK sub-codebook, or includes a first HARQ-ACK sub-codebook and a second HARQ-ACK sub-codebook; and receiving the HARQ-ACK codebook.

In an embodiment of the present application, in the case that there is one downlink transmission is one downlink transmission, the HARQ-ACK codebook is determined to include only the first HARQ-ACK sub-codebook. In the case that there are more than one downlink transmission transmitted on a carrier configured with TB-based retransmission or on a carrier configured with CBG-based retransmission and scheduled by DCI format 1_0, the HARQ-ACK codebook is determined to include only the first HARQ-ACK sub-codebook. In the case there are more than one downlink transmission transmitted on a carrier configured with CBG-based retransmission and scheduled by DCI format 1_1, the HARQ-ACK codebook is determined to include only the first HARQ-ACK sub-codebook. In the case there are more than one downlink transmission, partly transmitted on a carrier configured with TB-based retransmission or on a carrier configured with CBG-based retransmission and scheduled by DCI format 1_0, and partly transmitted on a carrier configured with CBG-based retransmission and scheduled by DCI format 1_1, the HARQ-ACK codebook is determined to include the first HARQ-ACK sub-codebook and the second HARQ-ACK sub-codebook.

A further embodiment of the present application provides an apparatus, which includes: a receiver that receives at least one downlink transmission; a processor that generates a first HARQ-ACK sub-codebook for the at least one downlink transmission, and determines whether to generate a second HARQ-ACK sub-codebook; and a transmitter that transmits a HARQ-ACK codebook. Wherein the HARQ-ACK codebook includes the first HARQ-ACK sub-codebook in response to the second HARQ-ACK sub-codebook determined not to be generated, or includes the first HARQ-ACK sub-codebook and the second HARQ-ACK sub-codebook in response to the second HARQ-ACK sub-codebook determined to be generated.

Yet another embodiment of the present application provides an apparatus, which includes a transmitter that transmits at least one downlink transmission; a processor that determines whether a HARQ-ACK codebook for the at least one downlink transmission includes only a first HARQ-ACK sub-codebook, or includes a first HARQ-ACK sub-codebook and a second HARQ-ACK sub-codebook; and a receiver that receives the HARQ-ACK codebook.

Embodiments according to the present application can at least avoid misunderstanding on the HARQ-ACK feedback for CA between a base unit and a remote unit.

BRIEF DESCRIPTION OF THE DRAWINGS

In order to describe the manner in which advantages and features of the present application can be obtained, a description of the present application is rendered by reference to specific embodiments thereof which are illustrated in the appended drawings. These drawings depict only example embodiments of the present application and are not therefore to be considered as limiting of its scope.

DETAILED DESCRIPTION OF THE INVENTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments of the present application at least provide methods and apparatuses for HARQ-ACK feedback for CA. To facilitate understanding, embodiments of the present application are provided under specific network architecture and new service scenarios, such as 3GPP 5G new radio (NR), 3GPP LTE Release 10 and onwards. Persons skilled in the art are well-aware that, with developments of network architecture and new service scenarios, the embodiments in the subject disclosure are also applicable to similar technical problems.

Figure 1:
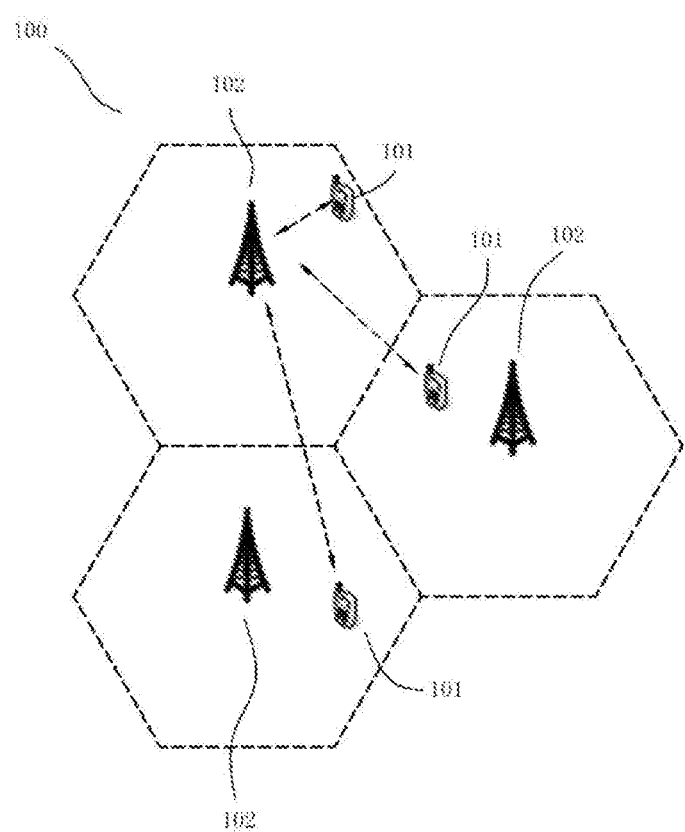
FIG. 1 illustrates an example block diagram of a wireless communication system according to an embodiment of the present application.

FIG. 1 illustrates an example block diagram of a wireless communication system according to an embodiment of the present application. As shown in FIG. 1, the wireless communication system 100 includes remote units 101 and base units 102. Even though a specific number of remote units 101 and base units 102 are depicted in FIG. 1, persons skilled in the art will recognize that the number of remote units 101 and the number of base units 102 in the wireless communication system 100 may change.

The remote units 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, modems), or the like. According to an embodiment of the present application, the remote units 101 may include a portable wireless communication device, a smart phone, a cellular telephone, a flip phone, a device having a subscriber identity module, a personal computer, a selective call receiver, or any other device that is capable of sending and receiving communication signals on a wireless network. In an embodiment, the remote units 101 include wearable devices, such as smart watches, fitness bands, optical head-mounted displays, or the like. Moreover, the remote units 101 may be referred to as subscriber units, mobiles, mobile stations, users, terminals, mobile terminals, wireless terminals, fixed terminals, subscriber stations, UE, user terminals, a device, or by other terminology used in the art. The remote units 101 may communicate directly with a base unit 102 via uplink or downlink communication signals.

The base units 102 may be distributed over a geographic region. In certain embodiments, a base unit 102 may also be referred to as an access point, an access terminal, a base, a base station, a macro cell, a Node-B, an enhanced Node B (eNB), a gNB, a Home Node-B, a relay node, a device, or by any other terminology used in the art. The base units 102 are generally part of a radio access network that may include one or more controllers communicably coupled to one or more corresponding base units 102.

The base units 102 are generally communicably coupled to one or more packet core networks (PCN), which may be coupled to other networks, like the packet data network (PDN) (e.g., the Internet) and public switched telephone networks, among other networks. These and other elements of radio access and core networks are not illustrated but are well known generally by those having ordinary skill in the art. For example, one or more base units 102 may be communicably coupled to a mobility management entity (MME), a serving gateway (SGW), and/or a packet data network gateway (PGW).

The base units 102 may serve a number of remote units 101 within a serving area, for example, a cell or a cell sector via a wireless communication link. The base units 102 may communicate directly with one or more of the remote units 101 via communication signals. For example, a base unit 102 may serve remote units 101 within a macro cell.

The base units 102 transmits DL communication signals to serve the remote units 101 in the time, frequency, and/or spatial domain. Furthermore, the DL communication signals may be carried over wireless communication links. The wireless communication links may be any suitable carrier in licensed or unlicensed radio spectrum. The wireless communication links facilitate communication between the remote units 101 and the base units 102.

The wireless communication system 100 is compliant with any type of network that is capable of sending and receiving wireless communication signals. For example, the wireless communication system 100 is compliant with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a LTE network, a 3GPP-based network, 3GPP 5G network, a satellite communications network, a high altitude platform network, and/or other communications networks.

In one implementation, the wireless communication system 100 is compliant with the LTE of the 3GPP protocol, wherein the base unit 102 transmits using an orthogonal frequency division multiplexing (OFDM) modulation scheme on the DL and the remote units 101 transmit on the UL using a single-carrier frequency division multiple access (SC-FDMA) scheme or OFDM scheme. More generally, however, the wireless communication system 100 may implement some other open or proprietary communication protocol, for example, WiMAX, among other protocols.

In other embodiments, the base unit 102 may communicate using other communication protocols, such as the IEEE 802.11 family of wireless communication protocols. Further, in an embodiment, the base unit 102 may communicate over licensed spectrum, while in other embodiments the base unit 102 may communicate over unlicensed spectrum. The present application is not intended to be limited to the implementation of any particular wireless communication system architecture or protocol. In another embodiment, the base unit 102 may communicate with remote units 101 using the 3GPP 5G protocols.

According to an embodiment of the present application, DL transport blocks (TBs) are carried on the Physical Downlink Shared Channel (PDSCH). The HARQ-ACK feedback bits corresponding to the PDSCH are transmitted either on the Physical Uplink Control Channel (PUCCH) or on the Physical Uplink Shared Channel (PUSCH). Two TBs can be transmitted in one PDSCH in one serving cell and in one slot at the most. One TB includes a plurality of code blocks, several code blocks in a TB are grouped into one code block group (CBG), and each code block within a code block group is independently decodable. That is, a TB includes at least one CBG. The number of code blocks within one CBG, i.e., CBG size, varies according to the TB size. The maximum number of CBGs per TB is configured by Radio Resource Control (RRC) signaling. For example, in a single-codeword (CW) configuration, the maximum configurable number of CBGs per TB may be 8, the possible max number of CBGs per TB is 2, 4, 6, or 8; and in a multiple-CW configuration, the maximum configurable number of CBGs per TB is 4, and the configured maximum number of CBGs per TB is the same between two TBs.

Regarding the solution of CA used in 3GPP 5G NR (which may be called "NR CA", for example), a 3GPP standard document named "TS38.213" specifies a dynamic HARQ-ACK codebook. More particularly, for dynamic HARQ-ACK codebook, when at least one carrier is configured with CBG-based retransmission, the dynamic HARQ-ACK codebook is composed of two sub-codebooks: a first HARQ-ACK sub-codebook including HARQ-ACK bits for PDSCHs with TB-based retransmission; and a second HARQ-ACK sub-codebook including HARQ-ACK bits for PDSCHs with CBG-based retransmission. Wherein, PDSCHs with TB-based retransmission include both the PDSCHs transmitted on TB-based carriers and the PDSCHs transmitted on CBG-based carriers while scheduled by fallback DCI (e.g. DCI format 1_0). PDSCHs with CBG-based retransmission include only the PDSCHs transmitted on CBG-based carriers and scheduled by non-fallback DCI (e.g. DCI format 1_1).

Meanwhile, dynamic scheduling means each PDSCH transmission is scheduled by the associated PDCCH. For SPS (semi-persistent scheduling), the PDSCH transmission has no associated PDCCH. RRC signaling is used to pre-configure the periodicity for SPS transmission. One activation PDCCH is used to activate the SPS transmission and indicate the necessary information, e.g., time-frequency resource, modulation and coding scheme and so on. Based on the reception of the activation PDCCH, remote units shall receive the SPS PDSCH periodically in the indicated time-frequency resource and this SPS PDSCH has no scheduling PDCCH. Another deactivation PDCCH is used to release the SPS PDSCH transmission. This deactivation PDCCCH needs HARQ-ACK feedback/HARQ-ACK codebook from the remote units.

For a dynamic HARQ-ACK codebook with two sub-codebooks, counter downlink assignment index (C-DAI) and total DAI (T-DAI) are separately applied to each sub-codebook, wherein C-DAI and T-DAI are specified in LTE Rel-13 enhanced Carrier Aggregation (eCA). However, that may cause several errors when a few TB-based PDSCHs or CBG-based PDSCHs are scheduled.

For example, for two-carrier CA case, PCell is configured with TB-based retransmission and SCell is configured with CBG-based retransmission. In one case, a base unit doesn't schedule any PDSCH on PCell and only schedules PDSCHs on SCell using DCI format 1_1, and accordingly a remote unit receives PDSCHs on SCell scheduled by DCI format 1_1. Although the remote unit can generate the second HARQ-ACK sub-codebook with the help of T-DAI, the remote unit cannot determine whether PDSCH on PCell is scheduled. Accordingly, the remote unit cannot determine the first HARQ-ACK sub-codebook. In another case, a base unit schedules one PDSCH on PCell and PDSCHs on SCell using DCI format 1_1. However, a remote unit may miss the PDSCH on PCell, and only receive PDSCHs on SCell scheduled by DCI format 1_1. Similarly, the remote unit still cannot determine whether PDSCH on PCell is scheduled and cannot determine the first HARQ-ACK sub-codebook. In a further case, the base unit may schedule one PDSCH on PCell and one PDSCH on SCell, but the remote unit only receives the PDSCH on PCell. The remote unit cannot know whether PDSCH on SCell is scheduled and cannot determine whether to generate the second HARQ-ACK sub-codebook.

Embodiments of the present application can solve the above issues at least. According to an embodiment of the present application, a method can be executed on the remote unit side and can include: receiving at least one downlink transmission; generating a first HARQ-ACK sub-codebook for the at least one downlink transmission; determining whether to generate a second HARQ-ACK sub-codebook; and transmitting a HARQ-ACK codebook. The HARQ-ACK codebook may include the first HARQ-ACK sub-codebook in response to the second HARQ-ACK sub-codebook being not generated, or include the first HARQ-ACK sub-codebook and the second HARQ-ACK sub-codebook in response to the second HARQ-ACK sub-codebook being generated.

The methods executed on the remote unit side according to embodiments of the present application can be operated on an apparatus according to embodiments of the present application, which may be a remote unit. For example, according to an embodiment of the present application, an apparatus includes: a receiver that receives at least one downlink transmission; a processor that generates a first HARQ-ACK sub-codebook for the at least one downlink transmission and determines whether to generate a second HARQ-ACK sub-codebook; and a transmitter that transmits a HARQ-ACK codebook. The HARQ-ACK codebook may include the first HARQ-ACK sub-codebook in response to the second HARQ-ACK sub-codebook determined not to be generated, or include the first HARQ-ACK sub-codebook and the second HARQ-ACK sub-codebook in response to the second HARQ-ACK sub-codebook determined to be generated. The processor may be one or more processors executing program codes, for example, a microcontroller, a microprocessor, a CPU, a GPU, an auxiliary processing unit, a FPGA, or the like.

According to another embodiment of the present application, a method can be executed on the base unit side, and can include: transmitting at least one downlink transmission; determining whether a HARQ-ACK codebook for the at least one downlink transmission includes only a first HARQ-ACK sub-codebook, or includes a first HARQ-ACK sub-codebook and a second HARQ-ACK sub-codebook; and receiving the HARQ-ACK codebook.

The methods executed on the base unit side according to embodiments of the present application can be operated on an apparatus according to embodiments of the present application, which may be a base unit. For example, according to an embodiment of the present application, an apparatus may include: a transmitter that transmits at least one downlink transmission; a processor that determines whether a HARQ-ACK codebook for the at least one downlink transmission includes only a first HARQ-ACK sub-codebook, or includes a first HARQ-ACK sub-codebook and a second HARQ-ACK sub-codebook; and a receiver that receives the HARQ-ACK codebook. The processor may be one or more processors executing program codes, for example, a microcontroller, a microprocessor, a CPU, a GPU, an auxiliary processing unit, a FPGA, or the like.

The HARQ-ACK codebook generated according to embodiments of the present application may be fully dynamic with specified CBG-level HARQ-ACK for each TB, or not fully dynamic as provided in the 3GPP standard document named "TS38.213," wherein the CBG-level HARQ-ACK for each TB is mapped to the RRC configured maximum number of CBGs per TB across all the carriers configured with CBG-based retransmission.

More details on the embodiments of the present application will be illustrated in the following text in combination with the appended drawings.

Figure 2:
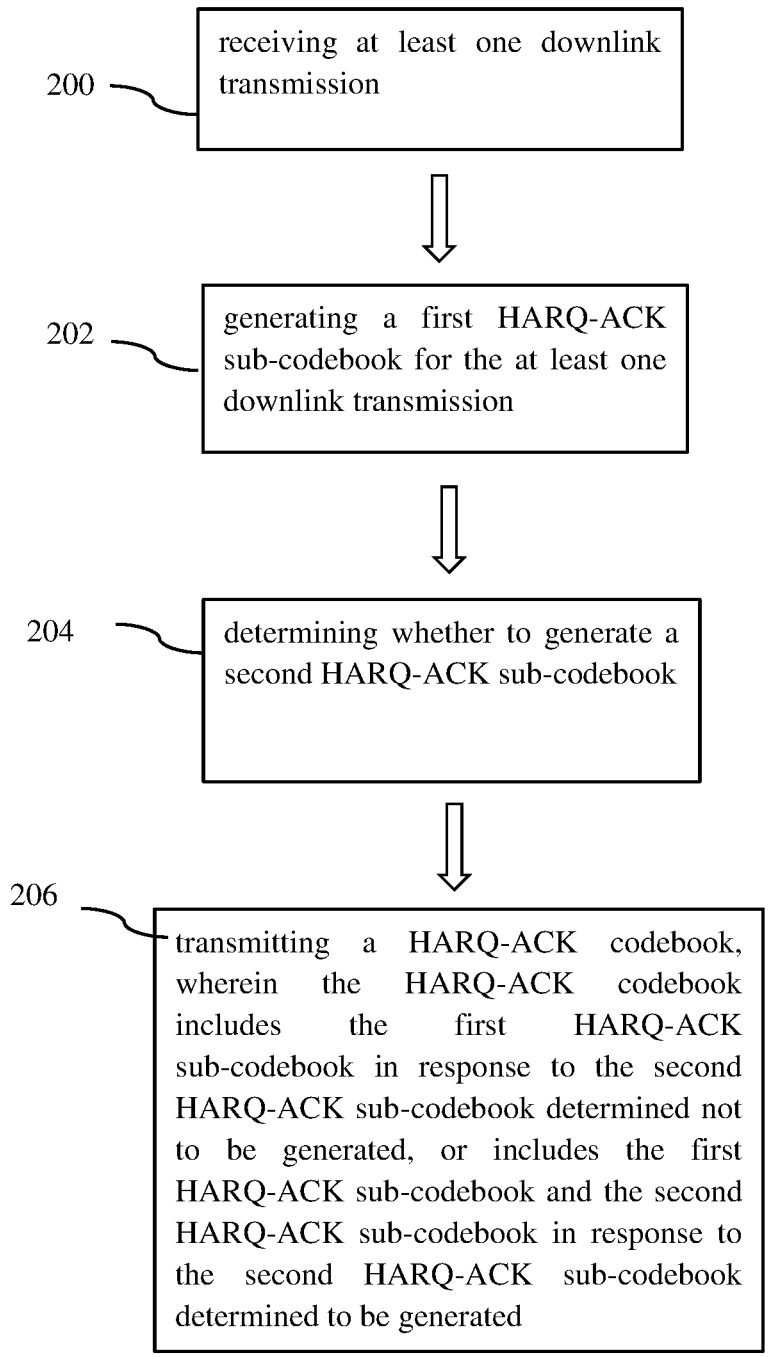
FIG. 2 illustrates a flow chart illustrating a method for HARQ-ACK feedback for carrier aggregation according to an embodiment of the present application.

FIG. 2 illustrates a flow chart illustrating a method for HARQ-ACK feedback for carrier aggregation according to an embodiment of the present application. The example method may be executed in a remote unit, such as a UE.

As shown in FIG. 2, in step 200, at least one downlink transmission is received, which can be transmitted from a base unit and received in a remote unit. There may be only one or more downlink transmissions in a carrier group received by a remote unit. In an embodiment of the present application, the downlink transmission can be transmitted on a carrier configured with TB-based retransmission or on a carrier configured with CBG-based retransmission and scheduled by DCI format 1_0. In another embodiment of the present application, all the downlink transmission can be transmitted on a carrier configured with CBG-based retransmission and scheduled by DCI format 1_1. In yet another embodiment of the present application, a part of the downlink transmission can be transmitted on a carrier configured with TB-based retransmission or on a carrier configured with CBG-based retransmission and scheduled by DCI format 1_0, while the other part of the downlink transmission can be transmitted on a carrier configured with CBG-based retransmission and scheduled by DCI format 1_1.

In step 202, a first HARQ-ACK sub-codebook for the at least one downlink transmission can be generated. In step 204, determination on whether to generate a second HARQ-ACK sub-codebook can be made. According to at least one embodiment of the present application, each bit in the first HARQ-ACK sub-codebook corresponds to one TB of the at least one downlink transmission, and each bit in the second HARQ-ACK sub-codebook corresponds to one CBG of one TB of the at least one downlink transmission. That is, the first HARQ-ACK sub-codebook is a sub-codebook including HARQ-ACK bits for PDSCHs with TB-based retransmission as specified in TS38.213, while the second HARQ-ACK codebook is a sub-codebook including HARQ-ACK bits for PDSCHs with CBG-based retransmission as specified in TS38.213. However, according to at least one other embodiment of the present application, each bit in the first HARQ-ACK sub-codebook corresponds to one code block group of one transport block of the at least one downlink transmission, and each bit in the second HARQ-ACK sub-codebook corresponds to one transport block of the at least one downlink transmission. That is, the first HARQ-ACK sub-codebook is a sub-codebook including HARQ-ACK bits for PDSCHs with CBG-based retransmission as specified in TS38.213, while the second HARQ-ACK codebook is a sub-codebook including HARQ-ACK bits for PDSCHs with TB-based retransmission as specified in TS38.213.

More specifically, the size of the first HARQ-ACK sub-codebook is clearly not zero. There is no doubt to generate the first HARQ_ACK sub-codebook in the remote unit side. However, in some cases, the remote unit is not sure whether a second HARQ-ACK sub-codebook should be generated although the size of the second HARQ-ACK sub-codebook is zero due to reasons as recited above. That is, the remote unit side cannot determine whether there are two HARQ-ACK sub-codebooks and cannot generate the second HARQ-ACK sub-codebook for the downlink transmission. Accordingly, determination on whether to generate a second HARQ-ACK sub-codebook can be made to avoid not reporting the second HARQ-ACK sub-codebook expected in the base unit side.

In the case that the second HARQ-ACK sub-codebook is determined to be generated, at least one bit, for example, at least one NACK bit can be generated for the second HARQ-ACK sub-codebook. According to at least an embodiment of the present application, the first HARQ-ACK codebook is a sub-codebook including HARQ-ACK bits for PDSCHs with TB-based retransmission, M NACK bits can be generated for the second HARQ-ACK sub-codebook, wherein M is the configured maximum number of code block groups per transport block across all the carriers configured with CBG-based retransmission. According to at least another embodiment of the present application, the first HARQ-ACK codebook is a sub-codebook including HARQ-ACK bits for PDSCHs with CBG-based retransmission, one NACK bit can be generated for the second HARQ-ACK sub-codebook.

Based on the two steps 202 and 204, a HARQ-ACK codebook can be generated. Then, in step 206, the generated HARQ-ACK codebook can be transmitted, for example, from a remote unit to a base unit. The HARQ-ACK codebook can only include the first HARQ-ACK sub-codebook in response to the second HARQ-ACK sub-codebook being not generated, or include the first HARQ-ACK sub-codebook and the second HARQ-ACK sub-codebook in response to the second HARQ-ACK sub-codebook being generated. In the case that the second HARQ-ACK codebook is generated, the HARQ-ACK codebook can be transmitted by appending the CBG-based HARQ-ACK sub-codebook to the TB-based HARQ-ACK sub-codebook.

More specifically, generating a second HARQ-ACK sub-codebook can be determined in various manners to at least avoid the ambiguity between the remote unit side and the base unit side according to embodiments of the present application.

In at least an embodiment of the present application, generation of a second HARQ-ACK sub-codebook can be determined based on whether the at least one downlink transmission is mapped to the first HARQ-ACK sub-codebook. In the case that there is a only one downlink transmission received by the remote unit, the second HARQ-ACK sub-codebook is determined not to be generated and the HARQ-ACK codebook can include only the first HARQ-ACK sub-codebook.

According to at least an embodiment of the present application, the method may include receiving an indicator for indicating a number of HARQ-ACK sub-codebooks and determining to generate the second HARQ-ACK sub-codebook based on the received indicator. The indicator may be included in a DCI. For example, a remote unit like a UE may receive a signaling for indicating a number of HARQ-ACK sub-codebooks. The signaling may be included in a DCI transmitted from a base unit.

According to at least an embodiment of the present application, considering there are up to two HARQ-ACK sub-codebooks in NR CA, one bit is used to indicate that the number of HARQ-ACK sub-codebook is 1 or 2. For example, the bit can be set as "0" to indicate that there is one HARQ-ACK sub-codebook, and set as "1" to indicate that there are two HARQ-ACK sub-codebooks. For downlink transmissions on a plurality of carriers and/or slots with corresponding HARQ-ACK feedback in the same HARQ-ACK codebook, the number of HARQ-ACK sub-codebooks is identical. That is, the bit for indicating the number of sub-codebook is set to the same value to avoid confusion during the generation of the HARQ-ACK feedback/codebook.

Based on the received indication of the number of HARQ-ACK sub-codebooks, various behaviors can be performed, which may be performed on an apparatus according to embodiments of the present application, such as a remote unit.

In at least one embodiment of the present application, the received indicator may indicate the number of HARQ-ACK sub-codebooks is two. However, only the first HARQ-ACK sub-codebook can be generated in the remote unit without the indicator. Thus, to transmit a HARQ-ACK codebook including the two HARQ-ACK sub-codebooks, at least one bit, for example NACK bit can be generated for the second HARQ-ACK sub-codebook. The CBG-based HARQ-ACK sub-codebook can be appended to the TB-based HARQ-ACK sub-codebook prior to transmission. Accordingly, there is no ambiguity or misunderstanding on the HARQ-ACK feedback/codebook between the remote unit side and the base unit side even if the size of the second HARQ-ACK sub-codebook was determined to be "0" based on the received downlink transmission.

For example, in the case that the first HARQ-ACK sub-codebook is a sub-codebook including HARQ-ACK bits for PDSCHs with TB-based retransmission, M NACK bits can be generated for the second HARQ-ACK sub-codebook. According to an embodiment of the present application, M is the RRC configured maximum number of CBGs per TB across all the carriers configured with CBG-based retransmission.

In the case that the first HARQ-ACK sub-codebook is a sub-codebook including HARQ-ACK bits for PDSCHs with CBG-based retransmission, one NACK bit can be generated for the second HARQ-ACK sub-codebook according to an embodiment of the present application.

According to at least another embodiment of the present application, the received indicator may indicate that the number of HARQ-ACK sub-codebooks is one. That is, it is unnecessary to generate the second HARQ-ACK sub-codebook. No bit will be generated for the second HARQ-ACK sub-codebook.

In addition to directly indicating the number of the HARQ-ACK sub-codebooks, indirect manners of indicating the number of the HARQ-ACK sub-codebooks can also be applied in embodiment of the present application. For example, according to at least one embodiment of the present application, the method may include receiving an indicator for indicating whether a second HARQ-ACK sub-codebook exists. Whether to generate the second HARQ-ACK sub-codebook is determined based on the indicator. Similarly, the indicator may be included in a DCI.

According to at least one embodiment of the present application, one bit is used to indicate whether a second HARQ-ACK sub-codebook exists. For example, the bit can be set as "0" to indicate that there is no second HARQ-ACK sub-codebook, and set as "1" to indicate that there is a second HARQ-ACK sub-codebook. For downlink transmissions on a plurality of carriers and/or slots with corresponding HARQ-ACK feedback in the same HARQ-ACK codebook, the number of HARQ-ACK sub-codebooks is identical. That is, the bit for indicating whether a second HARQ-ACK sub-codebook exists is set to the same value to avoid confusion during generating the HARQ-ACK feedback/codebook.

The indicator may be received in a non-fallback DCI, e.g., DCI format 1_1 on CBG-based carrier. In this case, the size of the first HARQ-ACK sub-codebook can be determined based on total DAI in the non-fallback DCI. That is, the first HARQ-ACK sub-codebook can be generated. Then, generating the second HARQ-ACK sub-codebook is determined based on the indicator.

The indicator may be received in a non-fallback DCI on TB-based carrier. In this case, the size of the first HARQ-ACK sub-codebook can be determined based on total DAI in the non-fallback DCI, and generating the second HARQ-ACK sub-codebook is determined based on the indicator.

The indicator may be received in a fallback DCI, e.g., DCI format 1_0 on either TB-based carrier or CBG-based carrier. In this case, the size of the first HARQ-ACK sub-codebook can also be determined, and generating the second HARQ-ACK sub-codebook is determined based on the indicator.

Based on the received indication of whether a second HARQ-ACK sub-codebook exists, various behaviors can be performed, which may be performed on an apparatus according to embodiments of the present application, such as a remote unit.

In at least an embodiment of the present application, the received indicator may indicate that the second HARQ-ACK sub-codebook exists. However, only the first HARQ-ACK sub-codebook can be generated in the remote unit without the indicator. To transmit a HARQ-ACK codebook including two HARQ-ACK sub-codebooks, at least one bit, for example NACK bit can be generated for the second HARQ-ACK sub-codebook. The CBG-based HARQ-ACK sub-codebook can be appended to the TB-based HARQ-ACK sub-codebook to be transmitted. Accordingly, there is no ambiguity or misunderstanding on the HARQ-ACK feedback/codebook between the remote unit side and the base unit side.

For example, according to at least an embodiment of the present application, the indicator is received in a non-fallback DCI on a CBG-based carrier, indicating the second HARQ-ACK sub-codebook exists. However, no PDSCH or PDCCH for semi-persistent scheduling (SPS) release with corresponding HARQ-ACK feedback in the second HARQ-ACK sub-codebook is received. That is, the size of the second HARQ-ACK sub-codebook is "0". In view of the indicator, one bit, such as one NACK bit can be generated for the second HARQ-ACK sub-codebook. The first HARQ-ACK sub-codebook can be appended to the second HARQ-ACK sub-codebook to be transmitted.

According to at least another embodiment of the present application, the indicator can be received in a non-fallback DCI on a TB-based carrier, indicating the second HARQ-ACK sub-codebook exists. However, no PDSCH or PDCCH for SPS release with corresponding HARQ-ACK feedback in the second HARQ-ACK sub-codebook was received. That is, the size of the second HARQ-ACK sub-codebook is determined to be "0". In view of the indicator, M bits, such as M NACK bits can be generated for the second HARQ-ACK sub-codebook, where M is the RRC configured maximum number of CBGs per TB across all the carriers configured with CBG-based retransmission. The second HARQ-ACK sub-codebook can be appended to the first HARQ-ACK sub-codebook to be transmitted.

According to at least a further embodiment of the present application, the indicator can be received in a fallback DCI on a TB-based carrier or CBG-based carrier, indicating the second HARQ-ACK sub-codebook exists. However, no PDSCH or PDCCH for SPS release with corresponding HARQ-ACK feedback in the second HARQ-ACK sub-codebook was received. That is, the size of the second HARQ-ACK sub-codebook is determined to be "0". In view of the indicator, M bits, such as M NACK bits can be generated for the second HARQ-ACK sub-codebook, where M is the RRC configured maximum number of CBGs per TB across all the carriers configured with CBG-based retransmission. The second HARQ-ACK sub-codebook can be appended to the first HARQ-ACK sub-codebook to be transmitted.

According to at least yet another embodiment of the present application, the received indicator may indicate that the second sub-codebook does not exist. That is, it is unnecessary to generate the second HARQ-ACK sub-codebook. No bit will be generated for the second HARQ-ACK sub-codebook.

In at least an embodiment of the present application, to reduce overload, the second HARQ-ACK codebook may be determined to be generated without any further indication from the base unit side. At least one bit is generated for the second HARQ-ACK codebook.

Figure 3:
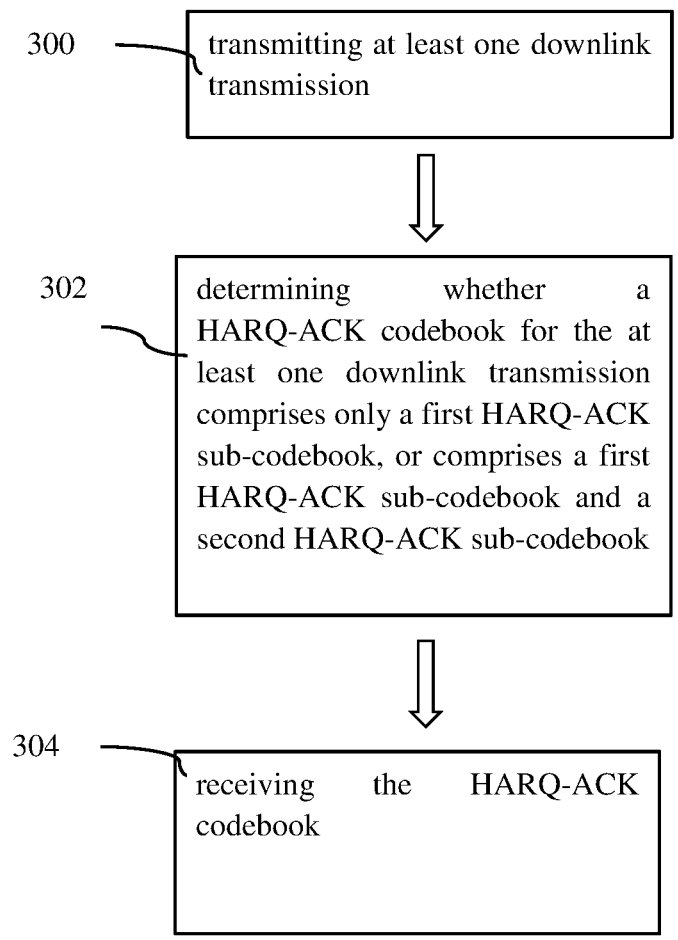
FIG. 3 illustrates a flow chart illustrating a method for HARQ-ACK feedback for carrier aggregation according to an embodiment of the present application.

FIG. 3 illustrates a flow chart illustrating a method for HARQ-ACK feedback for carrier aggregation according to an embodiment of the present application. The example method may be executed in a base unit, such as a gNB.

As shown in FIG. 3, in step 300 of the example method, at least one downlink transmission is transmitted to the remote unit.

In step 302, whether a HARQ-ACK codebook for the at least one downlink transmission includes only a first HARQ-ACK sub-codebook in response to the second HARQ-ACK sub-codebook determined not to be generated, or includes a first HARQ-ACK sub-codebook and a second HARQ-ACK sub-codebook in response to the second HARQ-ACK sub-codebook determined to be generated. According to at least an embodiment of the present application, in the case that there is one downlink transmission, the HARQ-ACK codebook is determined to include only the first HARQ-ACK sub-codebook. In the case that there are more than one transmitted on a carrier configured with TB-based retransmission or on a carrier configured with CBG-based retransmission and scheduled by DCI format 1_0, the HARQ-ACK codebook is determined to include only the first HARQ-ACK sub-codebook. In the case that there are more than one transmitted on a carrier configured with CBG-based retransmission and scheduled by DCI format 1_1, the HARQ-ACK codebook is determined to include only the first HARQ-ACK sub-codebook. In the case that there are more than one downlink transmission, partly transmitted on a carrier configured with TB-based retransmission or on a carrier configured with CBG-based retransmission and scheduled by DCI format 1_0, and partly transmitted on a carrier configured with CBG-based retransmission and scheduled by DCI format 1_1, the HARQ-ACK codebook is determined to include the first HARQ-ACK sub-codebook and the second HARQ-ACK sub-codebook.

In step 304, the HARQ-ACK codebook is received from the remote unit, wherein the method illustrated as above in the remote unit side can be operated to generate the HARQ-ACK codebook.

Figure 4:
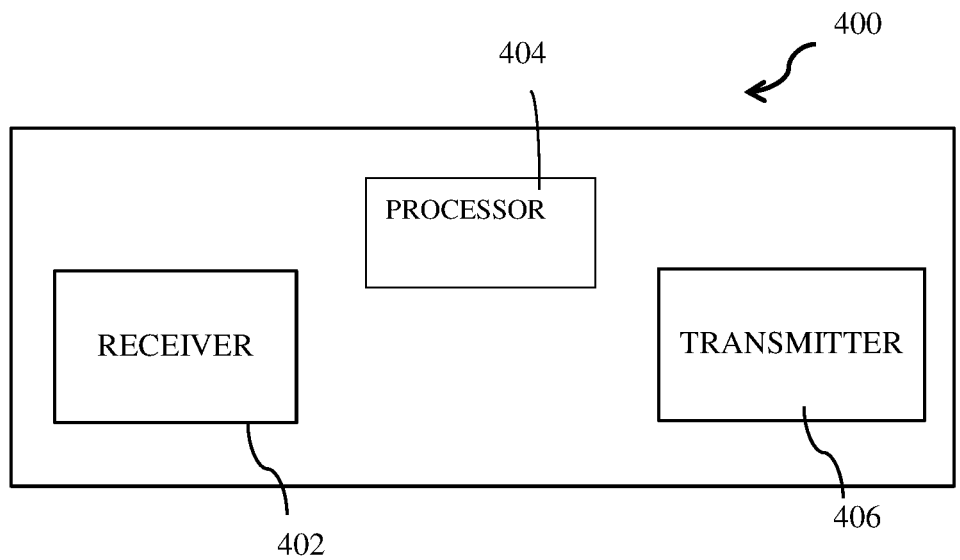
FIG. 4 illustrates an example block diagram of an apparatus according to an embodiment of the present application.

FIG. 4 illustrates an example block diagram of an apparatus 400 according to an embodiment of the present application, on which the method illustrated as above in the remote unit side can be operated.

As shown in FIG. 4, the apparatus 400 may be a remote unit or include a remote unit. Furthermore, the apparatus 400 may include a receiver 402, a processor 404 and a transmitter 406. The receiver 402 can receive at least one downlink transmission. The processor 404 can generate a first HARQ-ACK sub-codebook for the at least one downlink transmission, and determine whether to generate a second HARQ-ACK sub-codebook. The transmitter 406 can transmit a HARQ-ACK codebook. To implement the method recited above and other use, more structures, components or elements may be included in the apparatus 400. The receiver 402, processor 404 and transmitter 406 can be partly or whole assembled or integrated together and even can be integrated with other elements. For example, the receiver 402 and transmitter 406 can be integrated into a transceiver.

Figure 5:
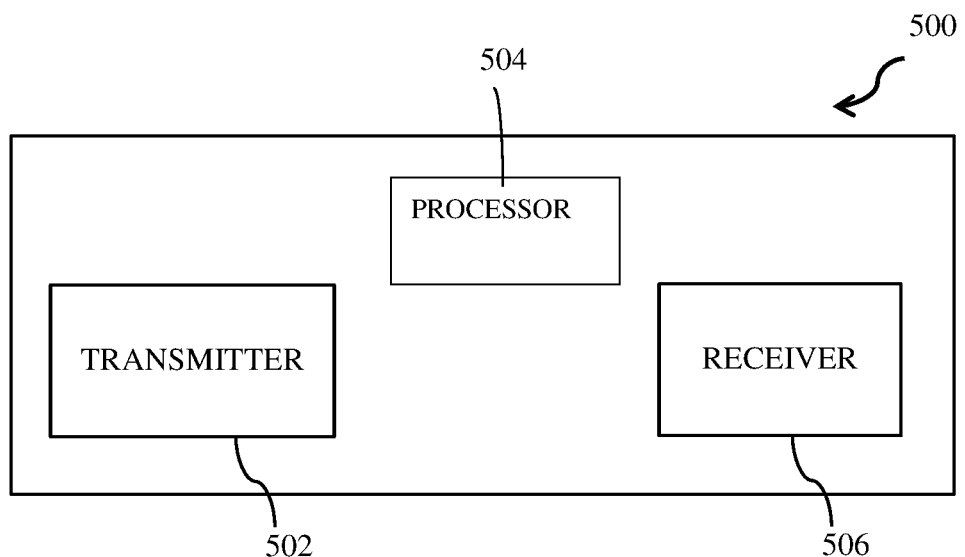
FIG. 5 illustrates an example block diagram of an apparatus 500 according to an embodiment of the present application

FIG. 5 illustrates an example block diagram of an apparatus 500 according to an embodiment of the present application, on which the method illustrated as above in the base unit side can be operated.

As shown in FIG. 5, the apparatus 500 may be a base unit or include a base unit. Furthermore, the apparatus 500 may include a transmitter 502, a processor 504 and a receiver 506. According to at least an embodiment of the present application, the transmitter 502 can transmit at least one downlink transmission. The processor can determine whether a HARQ-ACK codebook for the at least one downlink transmission includes only a first HARQ-ACK sub-codebook, or includes a first HARQ-ACK sub-codebook and a second HARQ-ACK sub-codebook. The receiver 506 can receive the HARQ-ACK codebook. To implement the method recited above and other use, more structures, components or elements may be included in the apparatus 500. The receiver 506, processor 504 and transmitter 502 can be partly or whole assembled or integrated together and even can be integrated with other elements. For example, the receiver 506 and transmitter 502 can be integrated into a transceiver.

The method of this disclosure can be implemented on at least one programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be capable of making and using the teachings of the present application by simply employing the elements of the independent claims. Accordingly, the embodiments of the present application as set forth herein are intended to be illustrative, not limiting. Various changes may be made without departing from the spirit and scope of the present application.

In this document, relational terms such as "first," "second," and the like may be used solely to distinguish one entity or action from another entity or action without necessarily requiring or implying any actual such relationship or order between such entities or actions. The terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The terms "including," "having," and the like, as used herein, are defined as "including."

What is claimed:

1. A method comprising:
   receiving at least one downlink transmission;
   generating a first hybrid automatic repeat request-acknowledgement sub-codebook for the at least one downlink transmission;
   determining whether to generate a second hybrid automatic repeat request-acknowledgement sub-codebook, wherein determining whether to generate the second hybrid automatic repeat request-acknowledgement sub-codebook is based on whether the at least one downlink transmission is mapped to the first hybrid automatic repeat request-acknowledgement sub-codebook;
   receiving an indicator for indicating whether the second hybrid automatic repeat request-acknowledgement sub-codebook exists;
   generating the second hybrid automatic repeat request-acknowledgement sub-codebook based on the received indicator; and
   transmitting a hybrid automatic repeat request-acknowledgement codebook, wherein the hybrid automatic repeat request-acknowledgement codebook comprises the first hybrid automatic repeat request-acknowledgement sub-codebook in response to the second hybrid automatic repeat request-acknowledgement sub-codebook determined not to be generated, or comprises the first hybrid automatic repeat request-acknowledgement sub-codebook and the second hybrid automatic repeat request-acknowledgement sub-codebook in response to the second hybrid automatic repeat request-acknowledgement sub-codebook determined to be generated.

2. The method of claim 1, wherein each bit in the first hybrid automatic repeat request-acknowledgement sub-codebook corresponds to one transport block of the at least one downlink transmission, and each bit in the second hybrid automatic repeat request-acknowledgement sub-codebook corresponds to one code block group of one transport block of the at least one downlink transmission.

3. The method of claim 2, comprising: in response to the second hybrid automatic repeat request-acknowledgement sub-codebook determined to be generated, generating M bits for the second hybrid automatic repeat request-acknowledgement sub-codebook, wherein M is the configured maximum number of code block groups per transport block across all the carriers configured with code block group-based retransmission.

4. The method of claim 1, wherein each bit in the first hybrid automatic repeat request-acknowledgement sub-codebook corresponds to one code block group of one transport block of the at least one downlink transmission, and each bit in the second hybrid automatic repeat request-acknowledgement sub-codebook corresponds to one transport block of the at least one downlink transmission.

5. The method of claim 4, comprising: in response to the second hybrid automatic repeat request-acknowledgement sub-codebook determined to be generated, generating one bit for the second hybrid automatic repeat request-acknowledgement sub-codebook.

6. The method of claim 1, comprising in response to the second hybrid automatic repeat request-acknowledgement sub-codebook determined to be generated, generating at least one bit for the second hybrid automatic repeat request-acknowledgement sub-codebook.

7. The method of claim 1, wherein determining whether to generate the second hybrid automatic repeat request-acknowledgement sub-codebook is based on whether the at least one downlink transmission is only mapped to the first hybrid automatic repeat request-acknowledgement sub-codebook.

8. The method of claim 1, further comprising: receiving an indicator for indicating a number of hybrid automatic repeat request-acknowledgement sub-codebooks, and generating the second hybrid automatic repeat request-acknowledgement sub-codebook based on the received indicator.

9. The method of claim 8, wherein the indicator is included in downlink control information.

10. A method comprising:
    transmitting at least one downlink transmission;
    transmitting an indicator for indicating whether a second hybrid automatic repeat request-acknowledgement sub-codebook exists;
    determining whether a hybrid automatic repeat request-acknowledgement codebook for the at least one downlink transmission comprises only a first hybrid automatic repeat request-acknowledgement sub-codebook, or comprises a first hybrid automatic repeat request-acknowledgement sub-codebook and the second hybrid automatic repeat request-acknowledgement sub-codebook, wherein the second hybrid automatic repeat request-acknowledgement sub-codebook is generated is based on whether the at least one downlink transmission is mapped to the first hybrid automatic repeat request-acknowledgement sub-codebook; and receiving the hybrid automatic repeat request-acknowledgement codebook.

11. The method of claim 10, wherein the first hybrid automatic repeat request-acknowledgement sub-codebook includes hybrid automatic repeat request-acknowledgement bits with each bit corresponding to one transport block of the at least one downlink transmission, and the second hybrid automatic repeat request-acknowledgement sub-codebook includes hybrid automatic repeat request-acknowledgement bits with each bit corresponding to one code block group of one transport block of the at least one downlink transmission.

12. The method of claim 10, wherein the first hybrid automatic repeat request-acknowledgement sub-codebook includes hybrid automatic repeat request-acknowledgement bits with each bit corresponding to one code block group of one transport block of the at least one downlink transmission, and the second hybrid automatic repeat request-acknowledgement sub-codebook includes hybrid automatic repeat request-acknowledgement bits with each bit corresponding to one transport block of the at least one downlink transmission.

13. The method of claim 10, wherein the transmitted indicator is included in downlink control information.

14. The method of claim 10, comprising:
in response to there being a single downlink transmission, determining the hybrid automatic repeat request-acknowledgement codebook to comprise only the first hybrid automatic repeat request-acknowledgement sub-codebook;
in response to there being more than one downlink transmission transmitted on a carrier configured with transport block-based retransmission or on a carrier configured with code block group-based retransmission and scheduled by downlink control information format 1_0, determining the hybrid automatic repeat request-acknowledgement codebook to comprise only the first hybrid automatic repeat request-acknowledgement sub-codebook;
in response to there being more than one downlink transmission transmitted on a carrier configured with code block group-based retransmission and scheduled by downlink control information format 1_1, determining the hybrid automatic repeat request-acknowledgement codebook to comprise only the first hybrid automatic repeat request-acknowledgement sub-codebook; and
in response to there being more than one downlink transmission, partly transmitted on a carrier configured with transport block-based retransmission or on a carrier configured with code block group-based retransmission and scheduled by downlink control information format 1_0, and partly transmitted on a carrier configured with code block group-based retransmission and scheduled by downlink control information format 1_1, determining the hybrid automatic repeat request-acknowledgement codebook to comprise the first hybrid automatic repeat request-acknowledgement sub-codebook and the second hybrid automatic repeat request-acknowledgement sub-codebook.

15. An apparatus comprising:
a receiver that receives at least one downlink transmission;
a processor that generates a first hybrid automatic repeat request-acknowledgement sub-codebook for the at least one downlink transmission, and determines whether to generate a second hybrid automatic repeat request-acknowledgement sub-codebook, wherein determining whether to generate the second hybrid automatic repeat request-acknowledgement sub-codebook is based on whether the at least one downlink transmission is mapped to the first hybrid automatic repeat request-acknowledgement sub-codebook; and
a transmitter that transmits a hybrid automatic repeat request-acknowledgement codebook, wherein the hybrid automatic repeat request-acknowledgement codebook comprises the first hybrid automatic repeat request-acknowledgement sub-codebook in response to the second hybrid automatic repeat request-acknowledgement sub-codebook determined not to be generated, or comprises the first hybrid automatic repeat request-acknowledgement sub-codebook and the second hybrid automatic repeat request-acknowledgement sub-codebook in response to the second hybrid automatic repeat request-acknowledgement sub-codebook determined to be generated, wherein:
the receiver receives an indicator for indicating whether the second hybrid automatic repeat request-acknowledgement sub-codebook exists; and
the processor generates the second hybrid automatic repeat request-acknowledgement sub-codebook based on the received indicator.

16. An apparatus comprising:
a transmitter that:
transmits at least one downlink transmission; and
transmits an indicator for indicating whether a second hybrid automatic repeat request-acknowledgement sub-codebook exists;
a processor that determines whether a hybrid automatic repeat request-acknowledgement codebook for the at least one downlink transmission comprises only a first hybrid automatic repeat request-acknowledgement sub-codebook, or comprises a first hybrid automatic repeat request-acknowledgement sub-codebook and the second hybrid automatic repeat request-acknowledgement sub-codebook, wherein the second hybrid automatic repeat request-acknowledgement sub-codebook is generated is based on whether the at least one downlink transmission is mapped to the first hybrid automatic repeat request-acknowledgement sub-codebook; and
a receiver that receives the hybrid automatic repeat request-acknowledgement codebook.

* * * * *